United States Patent
Shoemaker

[11] 3,975,088
[45] Aug. 17, 1976

[54] THREE ELEMENT EYEPIECE WITH MAGNIFICATION OF 12X

[75] Inventor: Arthur H. Shoemaker, East Aurora, N.Y.

[73] Assignee: American Optical Corporation, Southbridge, Mass.

[22] Filed: Aug. 1, 1975

[21] Appl. No.: 600,986

[52] U.S. Cl. .............................. 350/175 E; 350/229
[51] Int. Cl.² ...................... G02B 3/00; G02B 9/12; G02B 25/00
[58] Field of Search .................... 350/175 E, 229

[56] References Cited
UNITED STATES PATENTS
3,888,567   6/1975   Shoemaker .................... 350/229

*Primary Examiner*—John K. Corbin
*Assistant Examiner*—Conrad Clark
*Attorney, Agent, or Firm*—Alan H. Spencer; William C. Nealon; H. R. Berkenstock, Jr.

[57] ABSTRACT

A three element 12X eyepiece has an apparent field of view of about 51.3° and a maximum exit pupil diameter of substantially 1.25mm.

2 Claims, 1 Drawing Figure

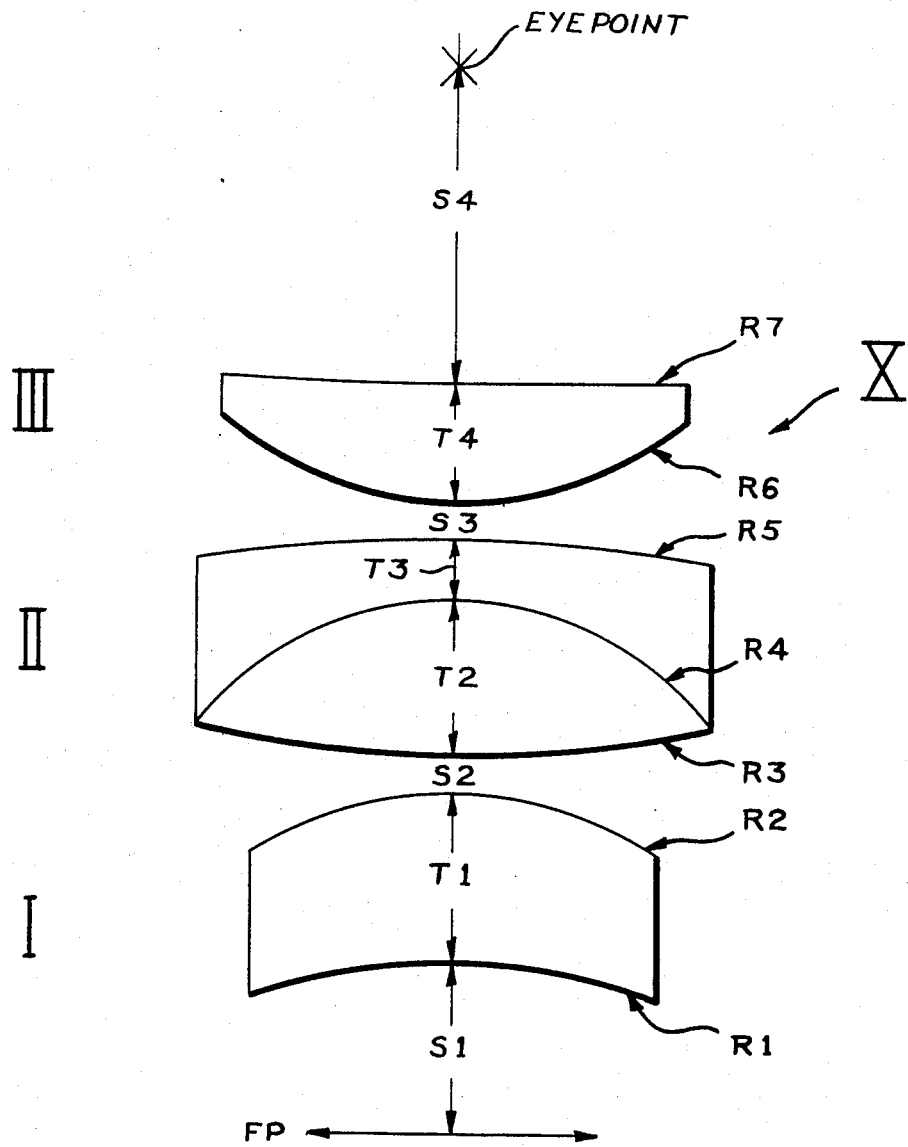

THREE ELEMENT EYEPIECE WITH MAGNIFICATION OF 12X

BACKGROUND OF THE INVENTION

This invention relates to microscope eyepieces and in particular to an eyepiece with a magnification of substantially 12X, an apparent field of view of substantially 51.3° and a maximum exit pupil diameter of substantially 1.25mm. It is an object of this invention to provide an eyepiece which is well-correct for coma, astigmatism, distortion, lateral color and pupil aberrations, especially pupil color and spherical aberration. It is a still further objective of this invention to provide an eyepiece which provides comfortable viewing by a microscopist with or without eyeglasses.

BRIEF DESCRIPTION OF THE DRAWING

FIG. 1 is an optical diagram of the eyepiece viewed transverse to the optical axis.

DESCRIPTION OF THE INVENTION AND PREFERRED EMBODIMENT

Referring to FIG. 1, an eyepiece X is shown diagramatically with optically aligned lenses I, II, and III. The first element I is a concavo-convex positive singlet, the second element II is a double convex positive doublet and the third element III is a convex-concavo positive singlet. The eyepiece has a Petzval radius of about 1.60F and an eye-relief of about 0.89F.

The parameters of an eyepiece according to the present invention are set forth in Table I with the axial thickness of successive lens elements designated T1 to T4, and the successive axial spaces from the eyepiece focal plane FP to the observer's eye designated S1 to S4. The successive lens radii are designated R1 to R7 where the minus sign (−) applies to surfaces whose center of curvature lies on the focal plane side of their vertices. The refractive indices and Abbe numbers of the glasses in the successive lenses are fixed absolute values designated ND(1) to ND(4), and $\nu(1)$ to $\nu(4)$ respectively.

TABLE I

| Lens | Radius (R) | Thickness (T) | Spacing (S) | Refractive Index (ND) | Abbe. No. ($\nu$) |
|---|---|---|---|---|---|
| | | | $S_1=0.43217F$ | | |
| I | $R_1=-1.11836F$ | $T_1=0.43217F$ | | $ND_1=1.58800$ | $\nu_1=61.19$ |
| | $R_2=-0.09522F$ | | $S_2=0.0048F$ | | |
| | $R_3=2.1882F$ | $T_2=0.40816F$ | | $ND_2=1.49776$ | $\nu_2=66.90$ |
| II | $R_4=-0.80743F$ | $T_3=0.14406F$ | | $ND_3=1.78446$ | $\nu_3=25.75$ |
| | $R_5=-2.59983F$ | | | | |
| | $R_6=0.94165F$ | | $S_3=0.0048F$ | | |
| III | $R_7=28.91205F$ | $T_4=0.28811F$ | | $ND_4=1.58800$ | $\nu_4=61.19$ |
| | | | $S_4=0.88835F$ | | |

Wherein F is the focal length of the eyepiece in millimeters.

The preferred embodiment of the present invention with a focal length F of 20.825mm wherein radii, thicknesses, and spacings are in millimeters has the following values:

TABLE II

| Lens | Radius (R) | Thickness (T) | Spacing (S) |
|---|---|---|---|
| | | | $S_1=9.000$ |
| I | $R_1=-23.290$ | $T_1=9.000$ | |
| | $R_2=-19.830$ | | $S_2=0.100$ |
| | $R_3=45.570$ | $T_2=8.500$ | |
| II | $R_4=-16.815$ | $T_3=3.000$ | |
| | $R_5=-54.142$ | | $S_3=0.100$ |
| | $R_6=19.610$ | $T_4=6.000$ | |
| III | $R_7=602.100$ | | |
| | | | $S_4=18.500$ |

It will be apparent that the foregoing absolute values are variable depending on the value of F. Therefore, other forms are thus possible and changes may be made in the values of the constructional data named on the relationships in the first of the above charts without departing from the spirit of the invention.

What is claimed is:

1. A microscope eyepiece having a magnification of about 12X and an apparent field of view of about 51.3° with a maximum exit pupil diameter of substantially 1.25mm and a focal plane F comprising three lens elements aligned along an optical axis extending from the focal plane of said eyepiece to provide a Petzval radius of 1.60F and eye-relief of 0.89F, said lenses having the following values,

| Lens | Radius (R) | Thickness (T) | Spacing (S) | Refractive Index (ND) | Abbe No. ($\nu$) |
|---|---|---|---|---|---|
| | | | $S_1=0.43217F$ | | |
| I | $R_1=-1.11836F$ | $T_1=0.43217F$ | | $ND_1=1.58800$ | $\nu_1=61.19$ |
| | $R_2=-0.09522F$ | | $S_2=0.0048F$ | | |
| | $R_3=2.1882F$ | $T_2=0.40816F$ | | $ND_2=1.49776$ | $\nu_2=66.90$ |
| II | $R_4=-0.80743F$ | $T_3=0.14406F$ | | $ND_3=1.78446$ | $\nu_3=25.75$ |
| | $R_5=-2.59983F$ | | $S_3=0.0048F$ | | |
| | $R_6=0.94165F$ | | | | |
| III | $R_7=28.91205F$ | $T_4=0.28811F$ | | $ND_4=1.58800$ | $\nu_4=61.19$ |
| | | | $S_4=0.8835F$ | | | wherein the axial thickness of successive lens elements are T1 to T4, successive axial spaces from the eyepiece focal plane are S1 to S4, successive lens radii are R1 to R7, where the minus sign (−) applies to surfaces whose center of curvature lies on the focal plane side of their vertices, refractive indices and Abbe numbers of the lenses are absolute fixed values ND(1) to ND(4), and $\nu(1)$ to $\nu(4)$ respectively, and F is the focal length in millimeters.

2. The eyepiece according to claim 1 wherein F is 20.825mm.

* * * * *